(12) United States Patent
Senn

(10) Patent No.: US 7,475,908 B2
(45) Date of Patent: Jan. 13, 2009

(54) ADJUSTABLE STEERING COLUMN FOR A MOTOR VEHICLE

(75) Inventor: Mathias Senn, Sevelen (CH)

(73) Assignee: ThyssenKrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 12/010,057

(22) Filed: Jan. 18, 2008

(65) Prior Publication Data

US 2008/0185829 A1     Aug. 7, 2008

Related U.S. Application Data

(63) Continuation of application No. PCT/EP2006/006426, filed on Jul. 1, 2006.

(30) Foreign Application Priority Data

Jul. 22, 2005     (DE) ................. 10 2005 035 009

(51) Int. Cl.
*B62D 1/018*     (2006.01)

(52) U.S. Cl. .................... 280/775; 280/777; 74/492; 74/493

(58) Field of Classification Search .......... 280/775, 280/776, 777; 74/492, 493
See application file for complete search history.

(56) References Cited

U.S. PATENT DOCUMENTS

| | | | | |
|---|---|---|---|---|
| 3,703,106 A | * | 11/1972 | Arntson et al. | ........... 74/492 |
| 3,815,438 A | * | 6/1974 | Johnson | ........... 74/492 |
| 4,541,298 A | * | 9/1985 | Strutt | ........... 74/493 |
| 4,753,121 A | * | 6/1988 | Venable et al. | ........... 74/493 |
| 4,981,049 A | * | 1/1991 | Venable et al. | ........... 74/493 |

(Continued)

FOREIGN PATENT DOCUMENTS

DE     196 17 561     9/1997

(Continued)

OTHER PUBLICATIONS

International Search Report issued Aug. 28, 2006 in the International (PCT) Application No. PCT/EP2006/006426.

*Primary Examiner*—Paul N. Dickson
*Assistant Examiner*—Timothy Wilhelm
(74) *Attorney, Agent, or Firm*—Wenderoth, Lind & Ponack, L.L.P.

(57) ABSTRACT

The invention proposes an adjustable steering column for a motor vehicle with a setting part displaceable in at least one setting direction for setting the position of the steering column, a holding part nondisplaceable in this setting direction and a securement device, in the opened state of which the setting part is displaceable with respect to the holding part for setting the position of the steering column, and in the closed state of which the setting part is secured in place by the securement device. A crash blocking device is provided, by which at least in the event of a crash, an additional holding force can be exerted against a dislocation of the setting part with respect to the holding part, which comprises a blocking element united with the setting part and a blocking element united with the holding part, wherein one of the blocking elements comprises scales acting resiliently out of the surface and the other of the two blocking elements has recesses, in such manner that at least some of the scales projecting resiliently from the surface of the one blocking element can be brought at least partially into engagement in corresponding recesses of the other blocking element in the closed state of the securement device.

14 Claims, 5 Drawing Sheets

U.S. PATENT DOCUMENTS

| | | | | |
|---|---|---|---|---|
| 5,105,677 | A * | 4/1992 | Hoblingre et al. | 74/493 |
| 5,338,064 | A * | 8/1994 | Sadakata et al. | 280/775 |
| 5,595,399 | A * | 1/1997 | Fouquet et al. | 280/777 |
| 5,685,565 | A * | 11/1997 | Schafer et al. | 280/777 |
| 5,743,150 | A * | 4/1998 | Fevre et al. | 74/493 |
| 5,829,310 | A * | 11/1998 | DePaolis | 74/492 |
| 5,988,679 | A | 11/1999 | Schelling et al. | |
| 6,036,228 | A * | 3/2000 | Olgren et al. | 280/775 |
| 6,039,350 | A | 3/2000 | Patzelt et al. | |
| 6,095,012 | A * | 8/2000 | Lutz | 74/493 |
| 6,363,810 | B2 * | 4/2002 | Danielsson | 74/493 |
| 6,581,965 | B2 * | 6/2003 | Lutz | 280/775 |
| 6,848,716 | B2 * | 2/2005 | Lutz | 280/775 |
| 2004/0155448 | A1 | 8/2004 | Klukowski et al. | |
| 2007/0113701 | A1 * | 5/2007 | Streng et al. | 74/492 |
| 2007/0164549 | A1 * | 7/2007 | Bastein et al. | 280/777 |

FOREIGN PATENT DOCUMENTS

| | | |
|---|---|---|
| DE | 102 61 538 | 12/2002 |
| EP | 0 836 981 | 10/1997 |
| EP | 1 170 194 | 1/2002 |
| FR | 2 270 488 | 12/1975 |

* cited by examiner

ADJUSTABLE STEERING COLUMN FOR A MOTOR VEHICLE

This is a Rule 1.53(b) Continuation of International Application No. PCT/EP2006/006426, filed Jul. 1, 2006

BACKGROUND OF THE INVENTION a) Field of the Invention

The invention relates to an adjustable steering column for a motor vehicle with a setting part displaceable in at least one setting direction for setting the position of the steering column, a holding part nondisplaceable in this setting direction, a securement device, in the opened state of which the setting part is displaceable with respect to the holding part for setting the position of the steering column, and, in the closed state of which, the setting part is secured in place with respect to the holding part by the securement device, wherein the adjustable steering column comprises a crash blocking device by which an additional holding force can be exerted against a dislocation of the setting part with respect to the holding part.

b) Description of related prior art

Adjustable steering columns serve for increasing the comfort of the driver and can be changed in length, height and/or angular position in order to be able to adapt the position of the steering wheel to the seating position of the driver. These steering columns include for this purpose a setting part whose position can be changed with respect to a holding part and be secured in place with a securement device or a clamping system.

In the case of adjustable steering columns the problem is encountered that in the event of a crash, uncontrolled displacement of the steering column must be prevented such that, for example, sufficient retaining force is available for opening the airbag and/or the energy upon the impact of the driver onto the steering wheel can be dissipated under control. The securement device should at the same time be readily-moved and it should be possible to open and close the device with minimal strokes of the actuation members and it should assume only low installation space.

To secure the adjusted position in place, in EP 0 802 104 B1, for example, disk lamella packs intersecting in the manner of sandwiches are proposed, wherein the one disk pack is connected on the steering spindle-receiving setting part, here a jacket unit, rotatably bearing-supporting the steering spindle, and the other disk pack is connected to a holding part connected with the motor vehicle chassis. The two intersecting disk packs are penetrated by a clamp bolt and are mutually seized by actuating a clamping lever. In order for the steering column to be adjusted, the lamellae have elongated holes oriented in the adjustment directions of the steering column, the elongated holes being oriented identically in all lamellae of a disk pack.

These systems already permit the securement of the steering column with few lamellae and a short actuation stroke and a relatively low clamping force. However, in order to be able to absorb the high holding forces, such as are required for the event of a crash, the number of lamellae and/or the clamping force must be increased. The securement device becomes thereby more complex, more expensive and occupies greater installation space. The strokes and forces for actuating the clamping lever, furthermore, become greater. In addition, the energy dissipation upon a slipping-through of the securement device can only be set imprecisely in the event of a crash.

EP 0 836 981, for example, proposes for securing the set position to bring into engagement a tooth rack, fastened on a bearing unit connected with the vehicle chassis, with a second tooth rack fastened on the shell unit receiving the steering spindle. For the adjustment of the steering column these tooth racks are brought out of engagement such that a dislocation of the steering column becomes possible.

In order for such systems not to slip through in the event of a crash, the toothings must be laid out such that they are correspondingly robust and a sufficient clamping force must be provided in order for the toothings not to come out of engagement. Therewith the strokes and forces for actuating the clamping lever become greater. A robust layout of the toothing, moreover, requires that the tooth spacings be increased whereby the step width, in which the steering column can be adjusted, is increased. However, for purposes of comfort it is desirable to permit an adjustment that is as continuous, or at least fine-stepped, as possible.

Both discussed principles require, in addition, a very high rigidity of the chassis-side bearing unit.

DE 196 17 561 C1 therefore proposes a crash blocking device with an additional arresting part, which acts independently of the securement device and, in the event of a crash, produces an additional holding force.

However, the disadvantage of this solution entails that such additional arresting part must be provided which requires additional installation space and expenses. It must further be ensured that such additional arresting part in the event of a crash, but only in this case, comes reliably into engagement and, for the case that the steering column is to be adjusted, is reliably brought out of engagement.

DE 102 61 538 A1 shows an adjustable motor vehicle steering column, in which means are integrated into the position securing unit for increasing the holding force for the event of a vehicle crash. The clamping arrangement includes for this purpose a canting part, wherein, upon twisting entailed in a deformation of the steering column, the entrainment of the canting part takes place and clamping edges and clamping faces come into engagement with one another such that the displaceability of the canting part is constrained.

PROBLEM ADDRESSED BY THE INVENTION AND SUMMARY OF THE INVENTION

The invention addresses the problem of providing a securement device for an adjustable steering column for a motor vehicle which, in the event of a crash, makes available a sufficiently large holding force such that, for example, the function of the airbag is ensured or, for example, the energy upon the impact of the driver onto the steering wheel can be absorbed under control. It should herein be feasible to actuate reciprocatingly the securement device with minimally possible actuation forces and/or actuation strokes between the opened and secured-in-place state. The entire system, which serves for normal driving operation and, in the event of a crash, serves for the securement in place, is preferably to be as simple, space-saving and cost-effective as possible and be producible from as few additional components as is possible.

The invention attains this in an adjustable steering column of the type described in the introduction thereby that the crash blocking device comprises a blocking element united with the setting part and a blocking element united with the holding part, wherein one of these blocking elements comprises at least one scale which in the unloaded state projects resiliently from the surface of the blocking element, and the other of these blocking elements has at least one recess, and in the closed state of the securement device at least one scale is located in the proximity of a recess or, upon an onsetting slipping-through of the setting part with respect to the holding part, reaches the proximity of a recess and the at least one scale located in the proximity of the recess or reaching this proximity projects into the recess and comes to lie opposite the edge of the recess.

When the securement device is opened, the scales and the recesses are brought out of engagement such that the setting part of the steering column can be adjusted with respect to the holding part of the steering column.

When the securement device is closed, the adjustment of the setting part with respect to the holding part is blocked. If, in the event of a crash, such high forces occur, for example through the recoil force of the airbag or the impact of the driver onto the steering wheel, that the securement device would not be capable of blocking the displacement of the setting part with respect to the holding part without the crash blocking device, an additional holding force against a dislocation of the setting part with respect to the holding part is provided by the crash blocking device.

This crash blocking device comprises the at least one scale, preferably several scales, on the one blocking element. During the closing of the securement device these scales are pressed against the surface of the other blocking element and individual scales can therein be brought into engagement in the at least one recess, preferably several recesses, of this other blocking element. In the event of a crash, the scales which are in engagement are coming to rest on the delimitations of the recess and therewith provide an additional holding force against a displacement of the setting part with respect to the holding part. It can herein occur that a scale is already in contact on an edge of a recess, such that this scale becomes immediately effective in the event of a crash and produces a holding force blocking the dislocation of the setting part with respect to the holding part. However, it may also occur that initially there is still a spacing between the free end of the scale and the edge of the recess and the scale only comes into contact after an onsetting dislocation of the setting part with respect to the holding part (in the closed state of the securement device), whereupon it becomes effective.

It is furthermore also possible, and entirely in terms of the solution according to the invention, that initially, in the closed state of the securement device, not a single scale is brought into engagement with a recess. In this case, in the event of a crash, an initial slipping-through of the setting part with respect to the holding part occurs, and therewith a dislocation of the two blocking elements with respect to one another. Through this dislocation at least one scale is positioned above a recess, wherein this scale, due to its resilient action, penetrates immediately into the opening of the recess and, with progressing dislocation, comes into contact on the edge of the recess such that in this case also an additional holding force against a displacement of the setting part with respect to the holding part is produced. Accordingly, a relatively short maximal dislocation path occurs which is predetermined by the disposition and layout of the scales and the recesses.

In the spring-relieved state, the scales only need to project minimally beyond the surface of the blocking element. If a scale, even if only minimally, penetrates into a recess, it is going to bend up further with progressing dislocation and is going to become firmly seized in a recess, such that a highly resistant blocking is attained against further dislocation of the setting part with respect to the holding part.

Due to this operational function, only a very short stroke for the opening and closing of the securement device needs to be provided, wherein the securement device, nevertheless, even in the event of a crash, produces a very high blocking force. The clamping forces for pressing the scales into the surface of the blocking element are herein small.

Due to the preferred integration of the crash blocking device, into the securement device the number of parts is not, or only minimally, increased.

Due to the disposition according to the invention, the securement device can be closed in every position.

The recesses are preferably laid out as pocket holes in order to increase therewith the blocking effect. It is therein especially simple to form this blocking element of an apertured part and a part located behind it, which covers the recesses.

The invention can advantageously be applied with different action principles of the securement device. Thus, the securement device can act under frictional locking by means of friction faces pressed against one another in the closed state and/or under positive locking, for example by means of toothings meshing with one another, in the closed state.

A steering column according to the invention which is adjustable in several displacement directions can comprise for only one displacement direction a crash blocking device according to the invention or for different displacement directions each one crash blocking device according to the invention.

In a feasible embodiment of the invention one of the two blocking elements is held by the holding part nondisplaceably in the displacement direction in which the blocking element acts. In another feasible embodiment one of the two blocking elements is implemented integrally with the holding part.

An embodiment example of the invention will be explained in conjunction with the schematic Figures.

DESCRIPTION OF THE PREFERRED EMBODIMENT EXAMPLES

Figure 1:
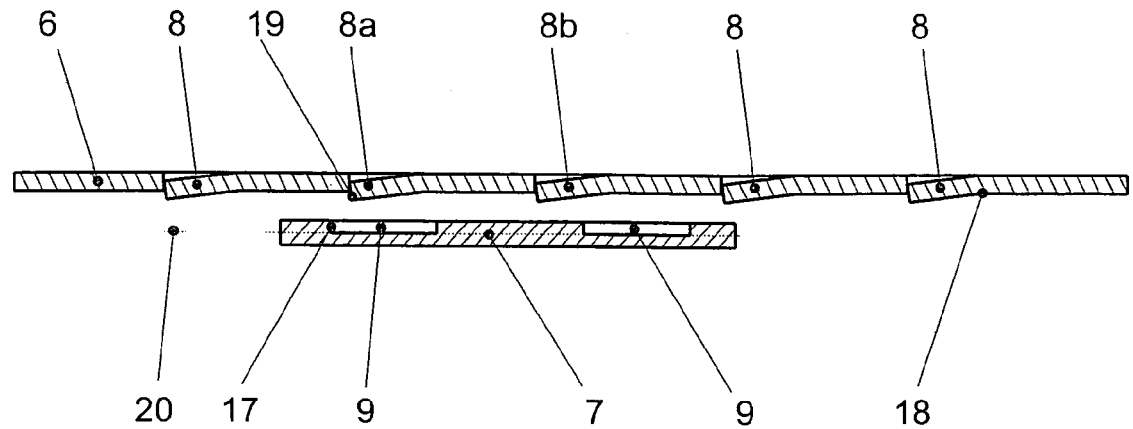
FIG. 1: schematic diagram with section through the crash blocking device in the opened state of the securement device.
Figure 2:
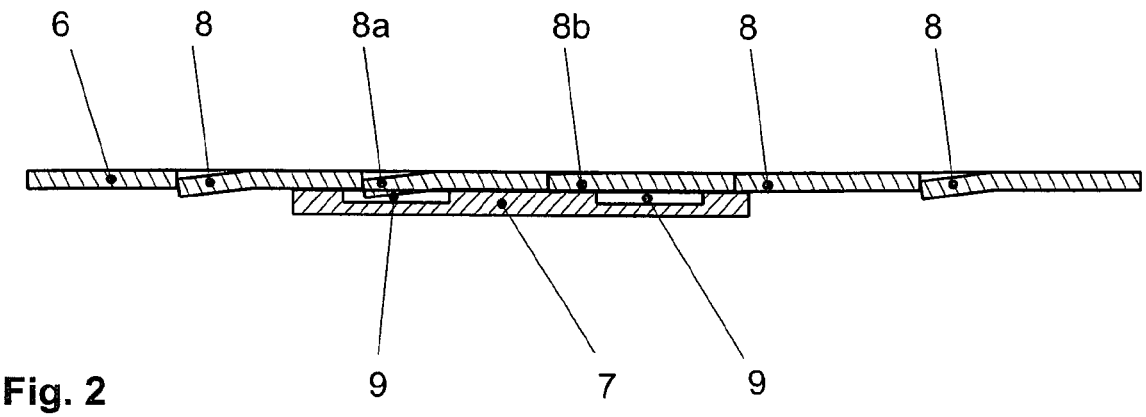
FIG. 2: schematic diagram with section through the crash blocking device in the closed state of the securement device.
Figure 3:
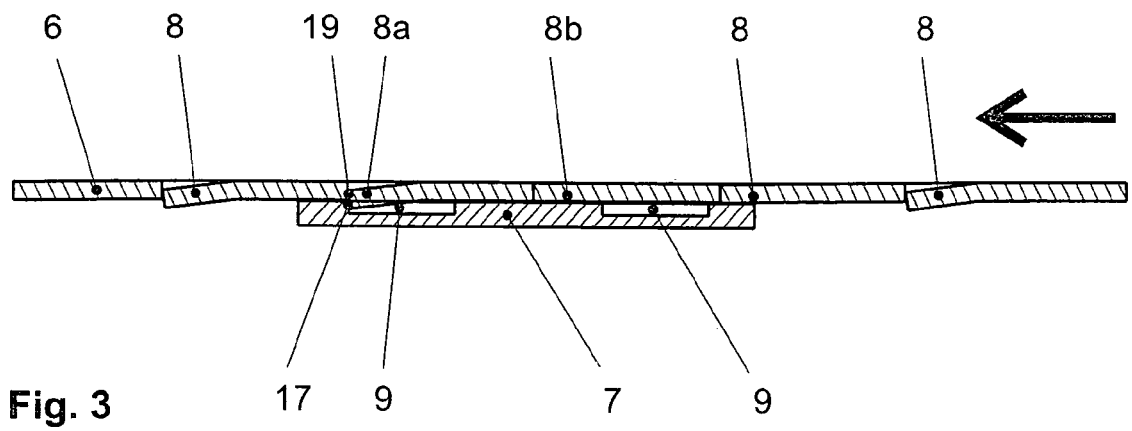
FIG. 3: schematic diagram with section through the crash blocking device in the closed state of the securement device in the event of a crash.
Figure 4:
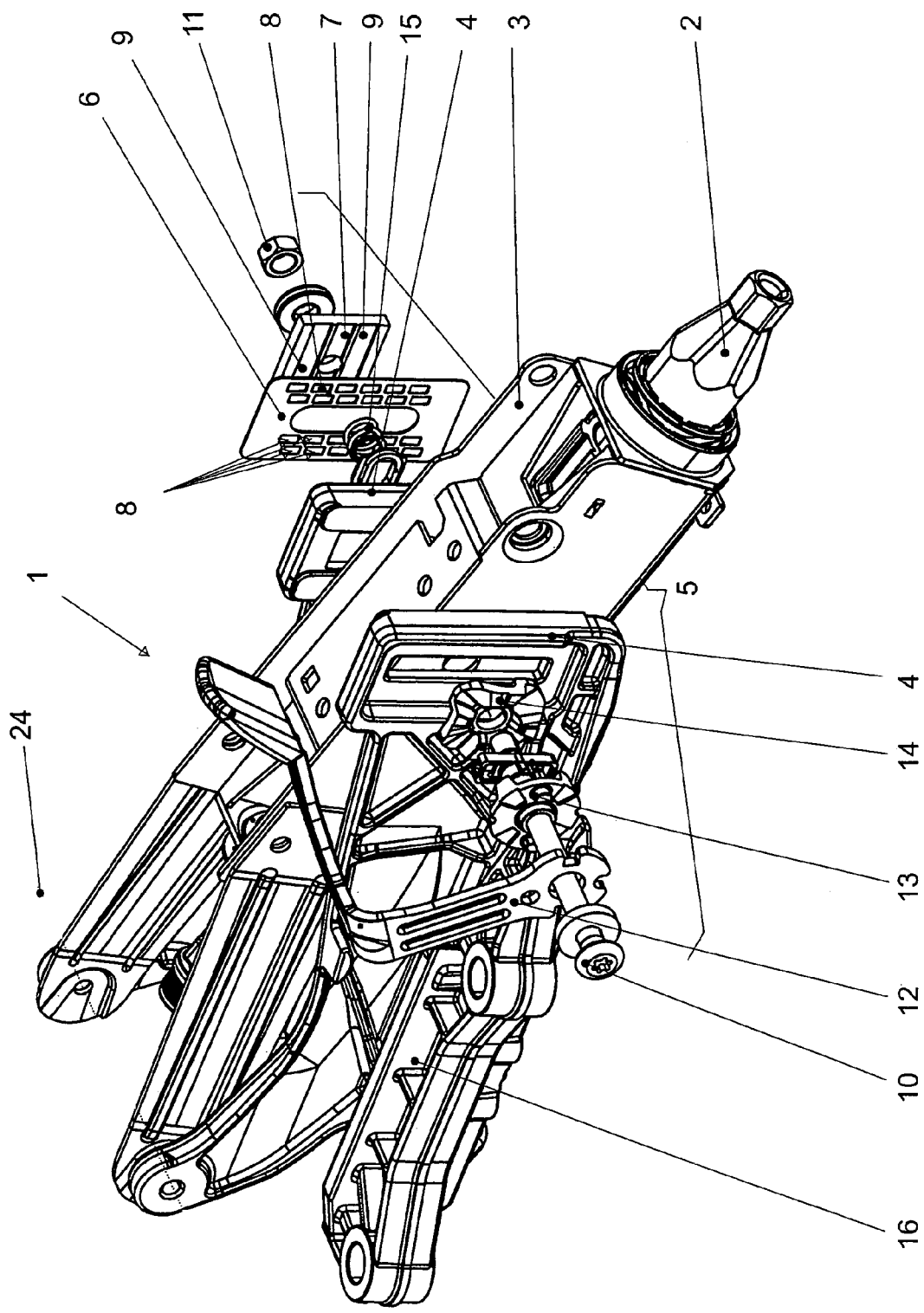
FIG. 4: embodiment of a steering column according to the invention in an exploded representation of the parts of the securement device.
Figure 5:
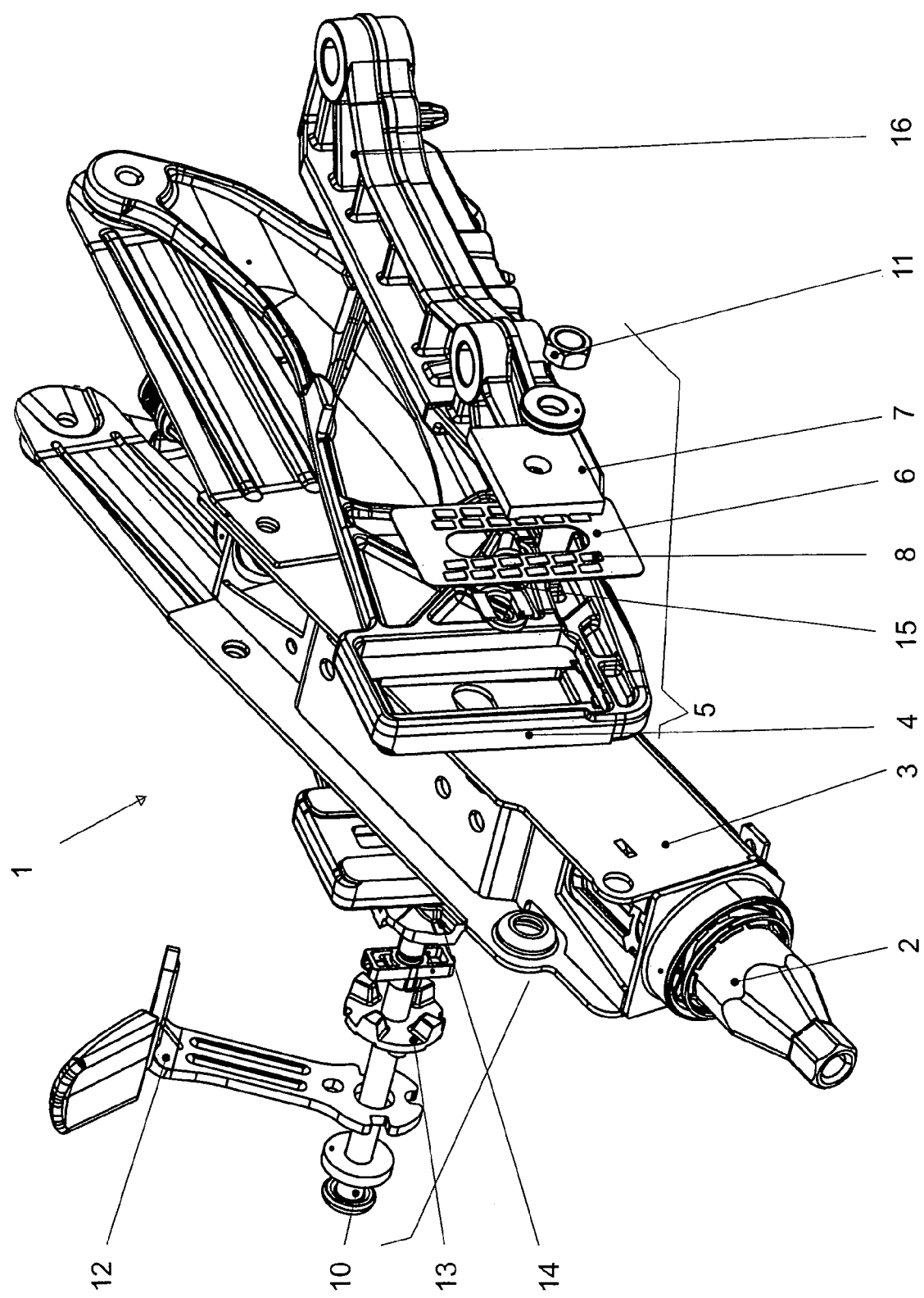
FIG. 5: embodiment of a steering column according to the invention in an exploded representation of the parts of the securement device in a view changed compared to FIG. 4.
Figure 6:
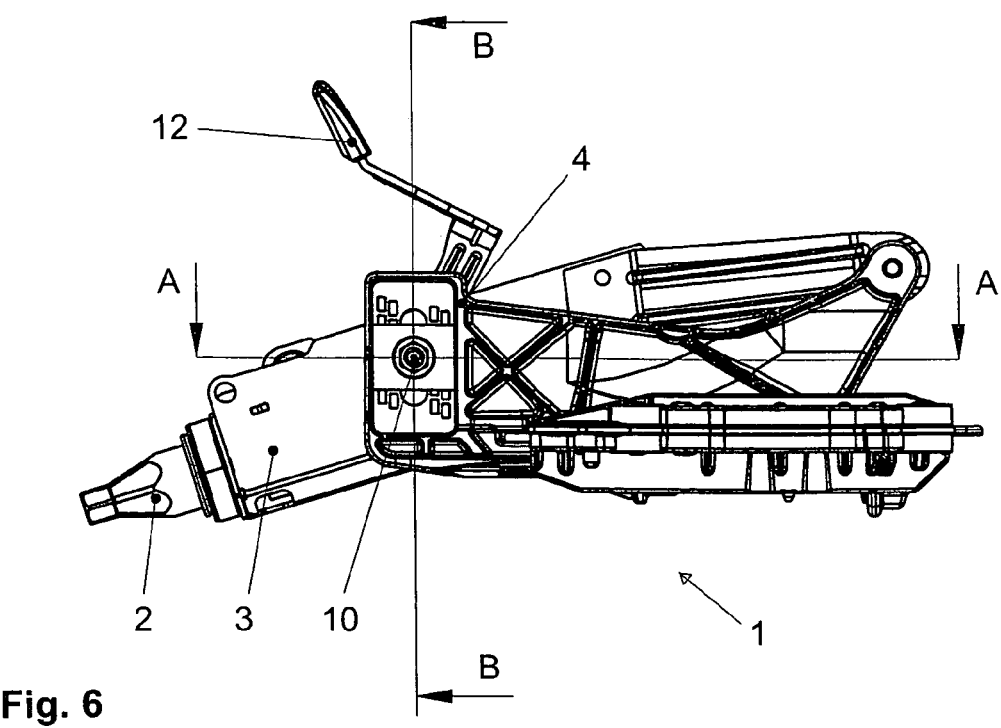
FIG. 6: side view of an embodiment of a steering column according to the invention.

FIGS. 1, 2 and 3 illustrate the operational principle of the crash blocking device which can be integrated into the securement system of an adjustable steering column. The one blocking element 6 comprises scales 8 projecting resiliently from its surface. The other blocking element 7 comprises recesses 9, whose openings face the scales 8. The recesses are preferably only open on one side.

This can be realized simply through a two-part implementation of the blocking element 7. Therein one element with pass-through recesses 9 and one element without recesses is placed on one another on the joint line 20 shown in FIG. 1. The elements can be connected, for example welded, with one another, or not be connected.

In the closed state of the securement device the blocking elements 6, 7 are placed in contact on one another, wherein individual scales 8b are pressed back into the surface of the blocking element 6 and other scales 8a project into the recesses 9 of the other blocking element 7 (cf. FIG. 2).

In the event of a crash, a dislocation force acts in the direction of the arrow onto the blocking element 6 united with the setting part, whereby in the example a small relative dislocation occurs until the end face 19 of the scale 8a comes into contact with the edge of the recess and here effects a blocking force against the further dislocation in the direction of the arrow (cf. FIG. 3).

In the opened state of the securement device the blocking elements 6, 7 are so far spaced apart that the scales 8 do not project into the recesses 9 (cf. FIG. 1).

The application of this crash blocking device to an adjustable steering column 1 is schematically illustrated in FIGS. 4 to 8. The steering column 1 comprises a steering spindle 2, on which the (not shown) steering wheel is fastened, held by a setting part 3 and rotatably bearing-supported, as well as a holding part 4, which is held in a bearing unit 16 fastened on the chassis of the (not shown) vehicle. In the depicted embodiment example the setting part 3 is a jacket tube or a jacket unit, which rotatably supports the steering spindle 2. The holding part 4 is formed by side jaws disposed on both sides of the jacket tube, which jaws are supported swivellably about a swivel axis 24 with respect to the jacket tube 3. The depicted embodiment example thus is a steering column adjusted only in height or in its swivel position with respect to the swivel axis 24.

Depending on the embodiment, in the event of a crash it can be provided, that the holding part 4 dislocates with respect to the bearing unit 16 with the consumption of energy. Solutions in this regard are not a component part of the invention and will therefore also not be further discussed here.

A securement device 5 makes feasible the securement in place and the enabling of the displacement of the position of the setting part 3 with respect to the holding part 4 with the clamping lever 12. In the example the securement device is implemented as a clamping system, in which a clamping axle 10 penetrates the holding part 4 and the setting part 3 and the opening and closing movements by rotation of a cam disk 13 against a connecting link disk 14 is enabled or blocked. The cam disk is actuated through the clamping lever 12.

The openings in the holding part 4 penetrated by the clamping axle 10 are formed as elongated holes which extend in the direction of the height adjustment of the steering column. The opening in the setting part 3 is penetrated by the clamping axle 10 with play, in order to be able to take up the arcuate movement of the setting part 3 about the swivel axis 24. Instead, the elongated holes in the holding part 4 could also be arcuate.

The one blocking element 7 is implemented as a planar plate which includes recesses 9. This blocking element 7 is preferably produced by sintering or as a sheet metal punched part. The sintering technology offers the advantage of simply forming the recesses as pocket holes or as grooves, directed perpendicularly to the possible displacement direction, without involving any reworking. In the implementation as sheet metal stamped part the recesses are punched through and preferably covered by a second sheet metal part on the side facing away from the scales 8, approximately along the joint line 20 indicated in FIG. 1.

Figure 7:
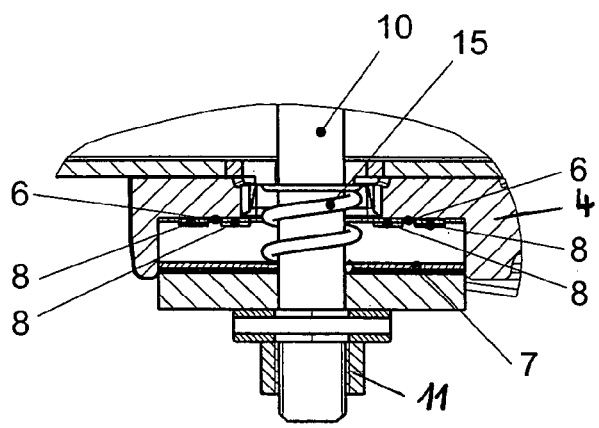
FIG. 7: sectional representation through the securement device in the opened state along section axis A-A in FIG. 6.
Figure 8:
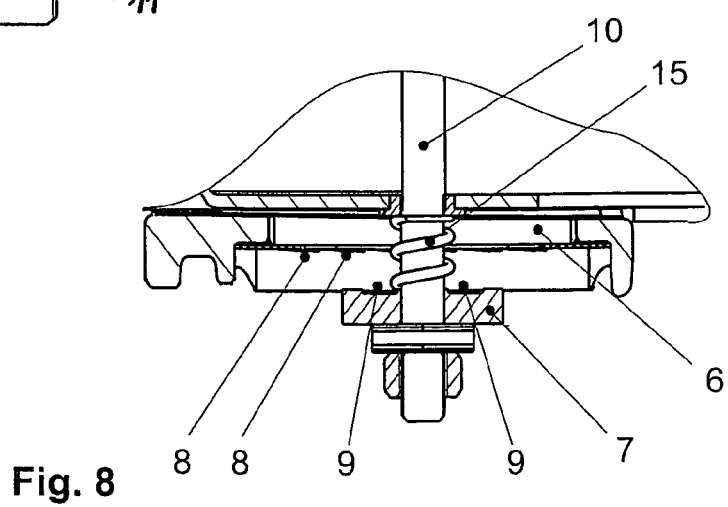
FIG. 8: sectional representation through the securement device in the opened state along section axis B-B in FIG. 6.

The blocking element 7 with recesses 9 is preferably held torsion-tight, in the depicted embodiment example through engagement into a recess in the holding part 4 (cf. FIG. 7).

Figure 9:
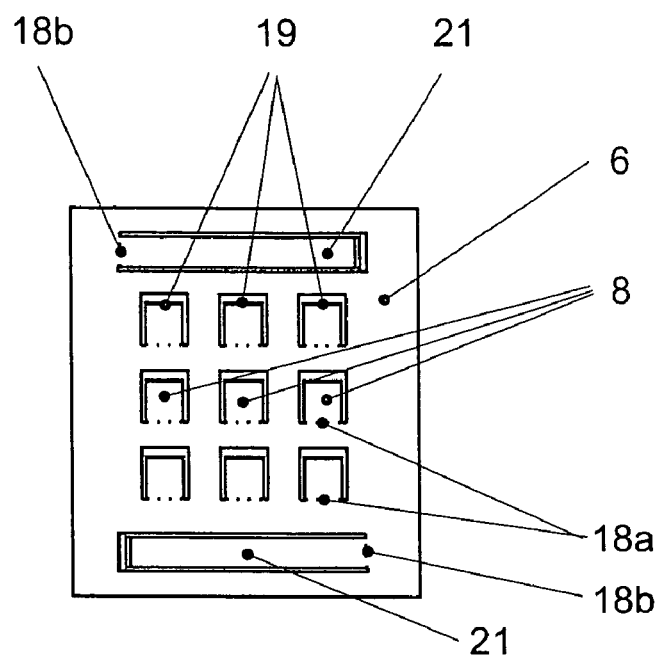
FIG. 9: schematic diagram with plan view onto the crash blocking device with the scales, seen from the side on which the scales project from the surface.

The other blocking element 6 is preferably formed as a planar sheet metal stamped part, in which scales 8 are generated by punching and stamping. This embodiment is schematically illustrated in FIG. 9. At least some of the end faces 19 of the scales 8 are so oriented that, when they project in the closed state of the securement device into a recess 9 of the other blocking element 7, they are located oppositely to the edge of the recess 9 (=the inner wall delimiting the recess 9, which wall is preferably at right angles to the displacement direction) and can thereby come to rest in contact on the edge of recess 9 and can effect the blocking of the setting part with respect to the holding part. Accordingly, in this embodiment through the stamping process a folding line 18a is formed in the transition from the blocking element to the formed-out scale.

In the schematic representation according to FIG. 9, all of the free ends of the scales 8 point in the same direction. However, there are preferably scales available whose free ends point in the opposite directions in order to attain in both directions of the displacement direction an additional holding force evoked by the crash blocking device.

In the depicted embodiment example this blocking element 6 is held against twisting under positive locking in a side jaw in holding part 4.

In the opened state of the securement device both blocking elements 6, 7 are raised out from one another. To this end, a spring 15 presses the two blocking elements apart such that the scales 8 are reliably brought out of engagement of the recesses 9. The maximal opening can be set with the holding nut 11.

In the closed state of the securement device both blocking elements 6, 7 are in contact on one another. Through the securement device the set position of the steering column is secured in place for "normal operation". For this purpose, in the depicted embodiment example the side jaws forming the holding part 4 are pressed onto the planar side faces of the setting part 3. Furthermore, the side, facing away from the cam disk 13, of the connecting link disk 14 is pressed onto the one side jaw. Further, the surface, facing the blocking element 6, of the blocking element 7, in the region in which there are no recesses, is pressed onto the blocking element 6, whereby a further friction-lock seizing is effected.

In the event of a crash, forces can act onto the steering column which would exceed the friction-lock holding of the setting part 3 with respect to the holding part 4. Such forces can be absorbed by the crash blocking device. For this purpose, free ends of scales 8 can come into contact on the edges of recesses 9 and block under positive locking the displacement of the setting part 3 with respect to the holding part 4, wherein a further bending-up of the scales 8 can occur.

In an advantageous further development of the invention, such spring is laid out analogously to the scales 8 or in the simplest further development at least one of the scales 8 of the blocking element 6, which does not engage into one of the recesses 9 of the other blocking element 7, exerts through contact with the surface of the blocking element 7 a spring force, which presses the blocking elements 6, 7 with the opened securement device 5 apart from one another and therewith permits the displaceability of the setting part 3 with respect to the holding part 4. In particular preferred is an additional scale integrated as a scale spring 21 into the blocking element 6, which can never engage into one of the recesses 9 of the other blocking element and preferably has a greater spring excursion than the remaining scales 8. For this purpose the blocking element 6 is, for example, implemented with two scale springs 21 whose folding edge 18*b* is oriented orthogonally to the folding edges 18*a* of the scales 8, as is schematically shown in FIGS. 9 and 10.

It is evident that the two blocking elements 6, 7 can also be interchanged in the securement device. This means that scale 8 is not oriented away from the side jaw but rather toward the side jaw of the holding part 4. Correspondingly, the blocking element 7 with the recesses 9 is not disposed on the side facing away from the holding part but rather between holding part and blocking element 6 with scales 8. The invention is correspondingly applicable to the two alternative embodiments:

A) the blocking element with scales 8 is united directly or indirectly with the holding part 4 and correspondingly the blocking element with the recesses 9 is directly or indirectly united with the setting part 3, as well as B) the blocking element with scales 8 is directly or indirectly united with the setting part 3 and correspondingly the blocking element with recesses 9 is directly or indirectly united with the holding part 4.

Figure 10:
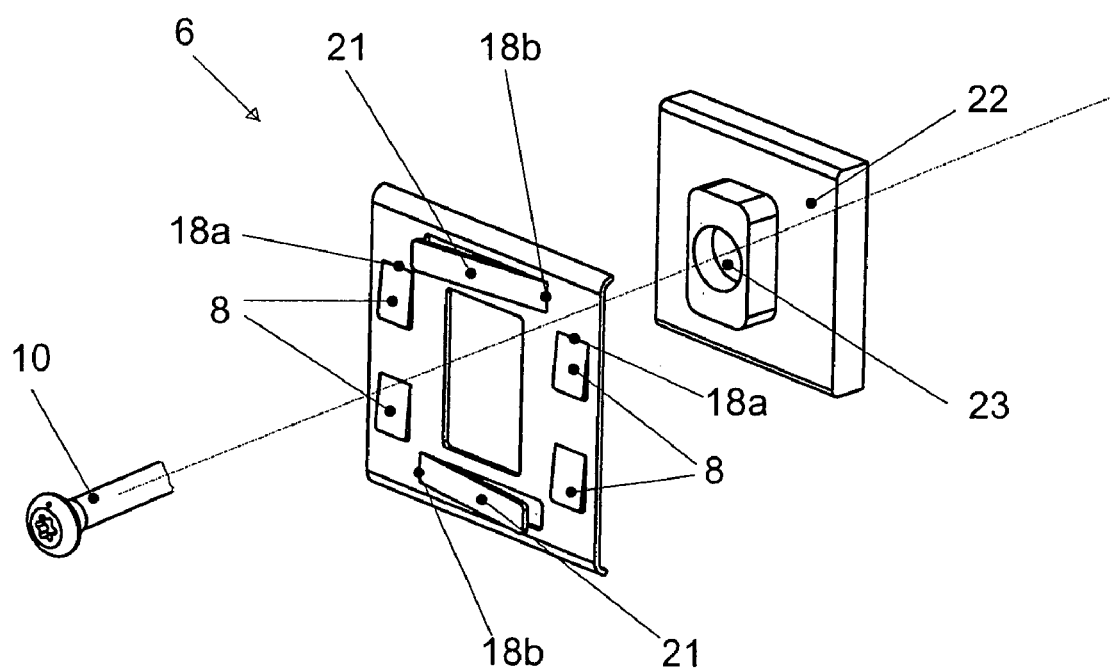
FIG. 10: embodiment of a blocking element with the scales.

FIG. 10 shows an alternative embodiment of a blocking element 6. This alternative embodiment is suitable for the alternative disposition, described in the preceding paragraph, of the blocking elements 6, 7 in the securement device 5, in which the blocking elements 6 and 7 are interchanged compared to the disposition shown in FIGS. 4 and 5. The blocking element 6 is here formed as a sheet metal punched part with four scales 8. In addition, two scale springs 21 are integrated in the sheet metal punched part, whose folding edge 18*b* is orthogonal to the folding edges 18*a* of scale 8. The blocking element is supported on a carrier element 22 by means of positive closure. The carrier element 22 according to this embodiment is guided via a cutout 23, through which is guided a clamp bolt, connected with the clamp bolt, and consequently with the setting part, nondisplaceably in the setting direction in which the blocking elements 6, 7 act, which is not further shown in FIG. 10.

It is also conceivable and feasible that at least one scale spring 21 is disposed on one of the blocking elements and at least one scale 8 on the other of the two blocking elements. Further, two such pairs of blocking elements can be provided, wherein each assumes the crash blocking for one of the two possible displacement directions of the setting part with respect to the holding part 4. The directions, in which the scales 8 cooperate correspondingly with the recesses 9, are oriented accordingly.

Even if in the embodiment shown here the crash blocking device is only disposed on one side of the holding part 4 and on the side facing away from the setting part 3, the crash blocking device can also be disposed on both sides and/or between holding part 4 and setting part 3. The scales can further also be represented by separately formed plates, which are pressed out of the blocking element with springs.

In a further advantageous embodiment of the invention, on the outside of the setting part 3 at least one disk lamella is fastened and on the holding part 4 is fastened at least one lamella, which intersects the lamella fastened on setting part 3, wherein the lamellae have openings penetrated by the clamping axle 10 and, in the closed state of the securement device, are stayed against each other. Preferably several such lamellae are provided in each instance and the two disk lamella packs penetrate each other on one or on both sides of the setting part 3 in the manner of sandwiches. Through such lamellae the number of friction faces can be increased. At least one of these lamellae can have the scales 8 of the crash blocking device. Such a steering column can be so implemented that it is adjustable in length as well as also in height or inclination. For both adjustment directions a crash blocking device according to the invention can be provided wherein preferably the scales 8 of the crash blocking device are each formed on at least one of the lamellae.

The invention is also applicable in connection with other frictional-locking and/or positive-locking securement devices, for example also with securement devices in which in the closed state toothings on setting parts and holding parts are brought into engagement with one another in order to block the dislocation into a particular displacement direction.

As is evident based on the above description, the scope of the invention is not limited to the depicted embodiment examples, but rather should be determined with reference to the attached claims together with its full range of possible equivalents. While the preceding description and the drawing represent the invention, it is obvious to a person of skill in the art that various modifications can be carried out therein without leaving the true spirit and scope of the invention.

LEGEND TO THE REFERENCE NUMBERS

1 Steering column
2 Steering spindle
3 Setting part
4 Holding part
5 Securement device
6 Blocking element
7 Blocking element
8 Scale
8*a* Scale
8*b* Scale
9 Recess
10 Clamping axle
11 Holding nut
12 Clamping lever
13 Cam disk
14 Connecting link disk
15 Spring
16 Bearing unit
17 Delimitation of the recess
18*a* Folding edge (or line) scale
18*b* Folding edge (or line) scale spring
19 Scale end face
20 Joint line
21 Scale spring
22 Carrier element
23 Cutout
24 Swivel axis
A Section plane
B Section plane

The invention claimed is:

1. An adjustable steering column for a motor vehicle, said adjustable steering column comprising:
a setting part displaceable in at least one setting direction for setting the position of the steering column;
a holding part nondisplaceable into the setting direction;
a securement device, in an opened state of which the setting part is displaceable with respect to the holding part for setting the position of the steering column, and in a closed state of which the setting part is secured in place by the securement device with respect to the holding part; and a crash blocking device by which an additional holding force against a dislocation of the setting part with respect to the holding part can be exerted, a first blocking element united with the setting part, and a second blocking element united with the holding part;

wherein one of said first and second blocking elements comprises at least one scale, which, in an unloaded state, projects resiliently from a surface of the blocking element, and the other of said first and second blocking elements has at least one recess, and, in a closed state of the securement device, at least one scale is located in the proximity of the recess or, upon an onsetting slipping-through of the setting part with respect to the holding part reaches the proximity of the recess and the at least one scale located in the proximity of the recess, or reaching such, projects into the recess and is located opposite one edge of the recess.

2. The adjustable steering column for a motor vehicle as claimed in claim 1, wherein the at least one scale in the opened state of the securement device is brought out of engagement with the at least one recess.

3. The adjustable steering column for a motor vehicle as claimed in claim 2, wherein a spring is provided, whose spring force in the opened state of the securement device brings the at least one scale out of engagement from the at least one recess.

4. The adjustable steering column for a motor vehicle as claimed in claim 1, wherein the securement device comprises a clamping axle jointly moved with the setting part at least in one displacement direction, which axle bears one of the first and second blocking elements, wherein said one of the first and second blocking elements is nondisplaceable in the displacement direction with respect to the clamping axle.

5. The adjustable steering column for a motor vehicle as claimed in claim 1, wherein one of said first and second blocking elements is fastened directly on the setting part.

6. The adjustable steering column for a motor vehicle as claimed in claim 1, wherein one of said first and second blocking elements is held by the holding part nondisplaceably into the displacement direction in which it acts, or is implemented integrally with the holding part.

7. The adjustable steering column for a motor vehicle as claimed in claim 1, wherein the one of the first and second blocking elements that comprises the at least one scale is formed of a metal sheet, the at least one scale and the blocking element that comprises the at least one scale are implemented integrally with one another, and the at least one scale is formed preferably by punching out a portion of its periphery and stamping.

8. The adjustable steering column for a motor vehicle as claimed in claim 1, comprising one of said crash blocking device for each displacement direction.

9. The adjustable steering column for a motor vehicle as claimed in claim 1, wherein the securement device comprises at least one lamella connected with the setting part and at least one lamella connected with the holding part, wherein at least one of these lamellae is formed as a blocking element, provided with at least one scale, of the crash blocking device.

10. The adjustable steering column as claimed in claim 8, wherein at least one of the lamellae connected with the setting part as well as also at least one of the lamellae connected with the holding part is formed as a blocking element, provided at least with at least one scale, of the crash blocking device.

11. The adjustable steering column for a motor vehicle as claimed in claim 1, wherein the crash blocking device is integrated in the securement device.

12. The adjustable steering column as claimed in claim 1, wherein the one of said first and second blocking elements comprises several scales for cooperating with the at least one recess of the other of said first and second blocking elements.

13. The adjustable steering column as claimed in claim 12, wherein scales are provided pointing with their free ends in opposite directions.

14. The adjustable steering column as claimed in claim 1, wherein the other of said first and second blocking elements comprises several recesses for cooperating with the at least one scale of the one of the first and second blocking elements.

* * * * *